(12) United States Patent
Winner et al.

(10) Patent No.: US 6,618,000 B2
(45) Date of Patent: Sep. 9, 2003

(54) METHOD AND DEVICE FOR CONTROLLING THE DISTANCE FROM A VEHICLE TO A PRECEDING VEHICLE

(75) Inventors: Hermann Winner, Bietigheim (DE); Albrecht Irion, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/009,547

(22) PCT Filed: Mar. 24, 2001

(86) PCT No.: PCT/DE01/01152
§ 371 (c)(1),
(2), (4) Date: Apr. 18, 2002

(87) PCT Pub. No.: WO01/76904
PCT Pub. Date: Oct. 18, 2001

(65) Prior Publication Data
US 2002/0135507 A1 Sep. 26, 2002

(30) Foreign Application Priority Data
Apr. 8, 2000 (DE) .......................................... 100 17 662

(51) Int. Cl.$^7$ .......................... G01S 13/93; B60K 31/00
(52) U.S. Cl. .............................. 342/71; 342/27; 342/28; 342/70; 342/104; 342/107; 342/113; 342/115; 342/118; 342/128; 342/133; 342/146; 342/147; 342/195; 701/93; 701/96; 701/300; 701/301; 180/167; 180/169; 180/170; 180/178
(58) Field of Search .............................. 342/70, 71, 72, 342/104–116, 118, 125, 127, 128–147, 175, 195, 27, 28; 180/167–179; 701/93–98, 300–302, 70

(56) References Cited

U.S. PATENT DOCUMENTS 4,621,705 A    11/1986    Etoh
5,749,426 A *  5/1998    Gilling .................... 180/167
5,864,285 A    1/1999    Wieder et al.
6,009,368 A    12/1999   Labuhn et al.
6,389,351 B1 * 5/2002    Egawa et al. ................ 701/93

FOREIGN PATENT DOCUMENTS

| DE | 196 27 727 A1 | 1/1998 |
| DE | 196 40 694 A1 | 4/1998 |
| DE | 198 04 641 A1 | 8/1999 |
| EP | 0 484 995 A2 | 5/1992 |
| FR | 2 732 651 A1 | 10/1996 |

OTHER PUBLICATIONS

"Adaptive Cruise Control—System Aspects and Development Trends" by Winner et al., published in the SAE 96, Detroit, pp. 26–29, Feb. 1996, Paper No. 961010.

* cited by examiner

Primary Examiner—Bernarr E. Gregory
(74) Attorney, Agent, or Firm—Kenyon & Kenyon

(57) ABSTRACT

In a method and apparatus for controlling the distance of a vehicle to a vehicle traveling ahead, in which the distance and the relative velocity of the vehicle traveling ahead are measured and the distance, in a distance control mode, is controlled by accelerating or decelerating the vehicle to a preestablished setpoint distance, wherein the deceleration permitted by the distance control process is limited and, in situations in which the setpoint distance cannot be maintained at this limited deceleration, the transition is made from the distance control process to a process limiting the distance to a minimum distance which is smaller than the setpoint distance, and the vehicle, after reaching the minimum distance, is further decelerated, so that the distance once again increases to the setpoint distance.

9 Claims, 3 Drawing Sheets

METHOD AND DEVICE FOR CONTROLLING THE DISTANCE FROM A VEHICLE TO A PRECEDING VEHICLE

FIELD OF THE INVENTION

The present invention relates to a method for controlling the distance of a vehicle to a vehicle traveling ahead, in which the distance and the relative velocity of the vehicle traveling ahead are measured, and the distance is controlled in a proximity-control mode by accelerating or decelerating the vehicle to a preestablished setpoint distance.

BACKGROUND INFORMATION

Methods and devices of this type are referred to by the name "adaptive road speed controller" as well as by the abbreviation "ACC" (Adaptive Cruise Control), and they are described, by way of example, in the article, "Adaptive Cruise Control—System Aspects and Development Trends" by Winner, Witte, et al., published in the SAE 96, Detroit, pp. 26–29, February 1996, Paper No. 961010. Specific aspects of systems of this type are described in German Published Patent Application No. 196 27 727 (corresponding to U.S. Pat. No. 6,311,117), German Published Patent Application No. 196 730 245, and German Published Patent Application No. 196 40 694 (corresponding to U.S. Pat. No. 6,273,204).

In conventional systems, proximity measurement is usually performed by a radar system, which on the basis of the Doppler effect also makes possible a direct measurement of the relative velocity, so that the control system is capable of reacting immediately to measured changes in the velocity of the vehicle traveling ahead.

The setpoint distance, upon which the control is based, corresponds to the safety distance to be maintained in column or convoy travel among vehicles traveling one after the other, and it is dimensioned so that, even in the case of longer vehicle columns and taking into account the reaction times of the drivers involved, rear-end collisions do not result if one vehicle has to brake abruptly due to an unexpected obstacle. This safety distance is a function of velocity and is therefore advantageously determined indirectly by a so-called setpoint time gap, which corresponds to the temporal interval in which vehicles pass the same point one after the other. In an ideal pursuit, the path-time curve of the pursuing vehicle is then the precise image, displaced by the setpoint time gap, of the path-time curve of the vehicle traveling ahead. The same also applies to the velocity-time curve as well as to the acceleration-time curve, it also being possible for the accelerations to have negative values (the deceleration of the vehicle is defined as the amount of negative acceleration).

In practice, inevitable control delays and differences in the vehicle characteristics (acceleration capacity) result in the path-time curve of the pursuing vehicle deviating somewhat from the corresponding curve of the vehicle traveling ahead. Deviations of this type are to a certain extent entirely desirable because they result in somewhat smoothing out speed fluctuations of an "unsteady" vehicle traveling ahead. This smoothing effect can also be strengthened in a controlled manner, for example, by having the accelerations of the vehicle traveling ahead, which are filtered by a low-pass characteristic, accessed by the control system.

An object of the present invention, in a proximity control system of this type, is to improve the comfort and the feeling of safety for the driver and the vehicle occupants.

SUMMARY

This objective is achieved according to the present invention as described herein.

In the method according to the present invention, the deceleration permitted in the proximity control process is limited, and in situations in which the setpoint distance cannot be maintained on the basis of this limited deceleration, the proximity controlling process transitions to a process of limiting the proximity to a minimum distance which is smaller than the setpoint distance, and after the minimum distance is reached, the vehicle is further decelerated so that the distance again increases to the setpoint distance.

If the own vehicle approaches at high speed the more slowly moving vehicle traveling ahead, or if, during pursuit, the vehicle traveling ahead is suddenly decelerated, then the method according to the present invention brings about the result that the following vehicle temporarily "dips" into the setpoint distance and then falls back until the setpoint distance is once again attained. In this manner, it may be avoided that the comfort and the feeling of safety are impaired by extreme vehicle decelerations. This dipping strategy, in the method according to the present invention, corresponds to the intuitive behavior of an experienced automobile driver. As a result of the present invention, the behavior of the control system is therefore brought to more closely approximate the natural behavior of a human automobile driver, and in the process irritations are avoided which may otherwise result from the different behavior of the automatic control system. The temporary undershooting of the setpoint distance is unobjectionable from the safety technical point of view because it is only brief, and the assumption may be made that the driver is very alert as a result of the braking. In the traffic-technical sense, the method according to the present invention has the effect that velocity fluctuations or abrupt velocity changes are far more powerfully cushioned than would be possible using a simple proximity control system. It is conventional that velocity fluctuations of this type, especially in heavy traffic buildups on a highway, may be amplified in a regressive wave and may finally lead to a traffic jam. In this regard, the present invention also contributes to the flow of traffic and therefore ultimately to traffic safety.

The minimum distance to the vehicle traveling ahead, which is not supposed to be undershot even in a dipping process, may be described by a time gap, which is designated as the dipping time gap and which is smaller than the setpoint time gap. The minimum distance is then the product of dipping time gap and velocity of the own (following) vehicle. The difference between the actual distance and the minimum distance is the deceleration distance (measured as the relative distance between the vehicles), within which, in response to dipping, the relative velocity between the vehicles may be reduced to zero. From this deceleration distance and the known instantaneous relative velocity, an acceleration value may be calculated using the path-time law for a uniformly accelerated motion, the acceleration value assuring that the relative velocity is actually reduced within the deceleration distance. However, this only applies under the assumption that the vehicle traveling ahead maintains its velocity at a constant value. If this is not the case, the calculated acceleration value may also have added to it the—if necessary, appropriately filtered—acceleration of the vehicle traveling ahead. On the basis of the acceleration obtained in this manner, it is possible to control the dipping process so that the minimum distance is not undershot, and the acceleration of the own vehicle in its amount remains as small as possible.

In principle, it is sufficient to determine the deceleration distance and the acceleration derived therefrom only once at the beginning of the dipping process and then, in the further course of the dipping process, to take into account only the accelerations of the vehicle traveling ahead. The velocity changes of the vehicle traveling ahead, however, may be even further cushioned if the deceleration distance and the acceleration derived therefrom are also continually actualized during the dipping process. However, to prevent the deceleration distance from becoming excessively small or from declining to zero, which may result in unrealistically high deceleration values, the deceleration distance in this case may be limited to a positive minimum value. In determining the deceleration distance, abrupt transitions may be avoided by performing interpolations in a proximity range below the setpoint distance, between the lower threshold value and the theoretical deceleration distance, which is yielded by the actual distance, the instantaneous vehicle velocity, and the setpoint time gap.

When, at the end of the dipping phase, the minimum distance to the vehicle traveling ahead has been attained, then the own vehicle may be further decelerated so that the distance again grows to the setpoint distance. This may be achieved using control technology by basing the calculation of the necessary acceleration from the deceleration distance and the relative velocity not on the actual relative velocity but rather by adding to this relative velocity an appropriate return velocity. The system behaves as if the velocity of the vehicle traveling ahead is smaller by the return velocity than the actual velocity. This has the consequence that the deceleration of the own vehicle does not end in a relative velocity of zero but rather ends in a positive relative velocity corresponding to the return velocity, so that the own vehicle again falls back to the setpoint distance.

When the setpoint distance is reached, it is possible to switch back to the normal proximity control system. However, with reference to a gentle transition between the different control modes, it is possible through additive superimposition to create a setpoint value from the acceleration values that are generated from the proximity control process and from the proximity limiting process, the setpoint value then being supplied to the engine control system. In the context of the proximity control process, in this case the value range of the permissible setpoint accelerations is limited so that only setpoint accelerations above a predetermined negative threshold value are generated, whereas in the proximity limiting process the value range of the accelerations is limited by an upper threshold value, for example, zero. By adding these setpoint values, the result is then a fluid transition between proximity limiting and proximity control.

Further advantages are yielded from the following descriptions of example embodiments.

The present invention is described below in greater detail on the basis of the example embodiment illustrated in the Figures.

DETAILED DESCRIPTION

Figure 1:
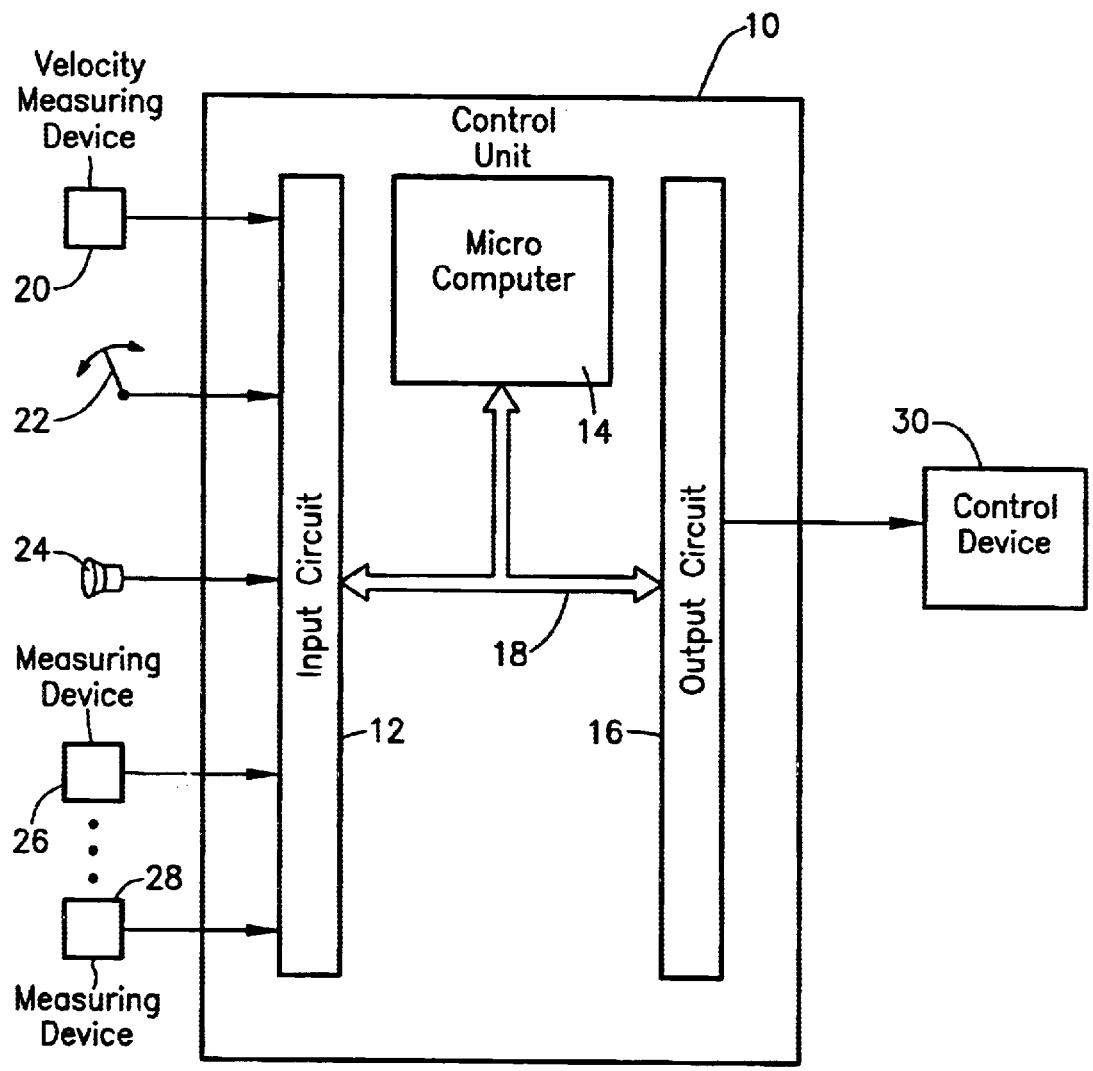
FIG. 1 is a block diagram of a control unit for controlling the velocity of a vehicle.

FIG. 1, in the form of a block diagram, illustrates a control unit 10 for an adaptive road speed controller of a motor vehicle, for example, a passenger car. Control unit 10 includes an input circuit 12, at least one microcomputer 14, and an output circuit 16, which are connected to each other for data exchange by a communications system 18.

A velocity measuring device 20 is configured to measure the velocity of the vehicle, an operating element 22 that may be actuated by the driver and that functions, inter alia, for inputting the setpoint velocity desired by the driver, and a distance measuring device 24, e.g., a radar device, supply input signals to input circuit 12. Additionally, input circuit 12 receives signals from further measuring devices 26, 28, which are configured to measure further operating variables of the vehicle, which are used in the adaptive road speed control system. Examples of this are the steering angle, the transverse acceleration, etc.

Microcomputer 14 evaluates the data that are input via input circuit 12 in the context of the adaptive road speed controller and, via output circuit 16, it drives a control device 30, for example, an electronic engine control device, which, for example, by influencing the throttle valve position, the ignition, etc., of the vehicle engine, determines the driving power and therefore ultimately the (positive or negative) acceleration of the vehicle.

Microcomputer 14 periodically executes a program, which calculates the setpoint acceleration (or deceleration) to be output in each case to control device 30. If no vehicle traveling ahead is located using the radar device, then a control process is performed to arrive at the setpoint velocity that is input by the driver. On the other hand, if the presence of a vehicle traveling ahead is established, then, using the radar device, its distance Dist and relative velocity Vrel are measured, and a control process is performed to arrive at velocity-dependant setpoint distance Dsoll, which corresponds to the required safety distance between the vehicles. This case is illustrated in FIG. 2 in the form of a path-time diagram.

Figure 2:
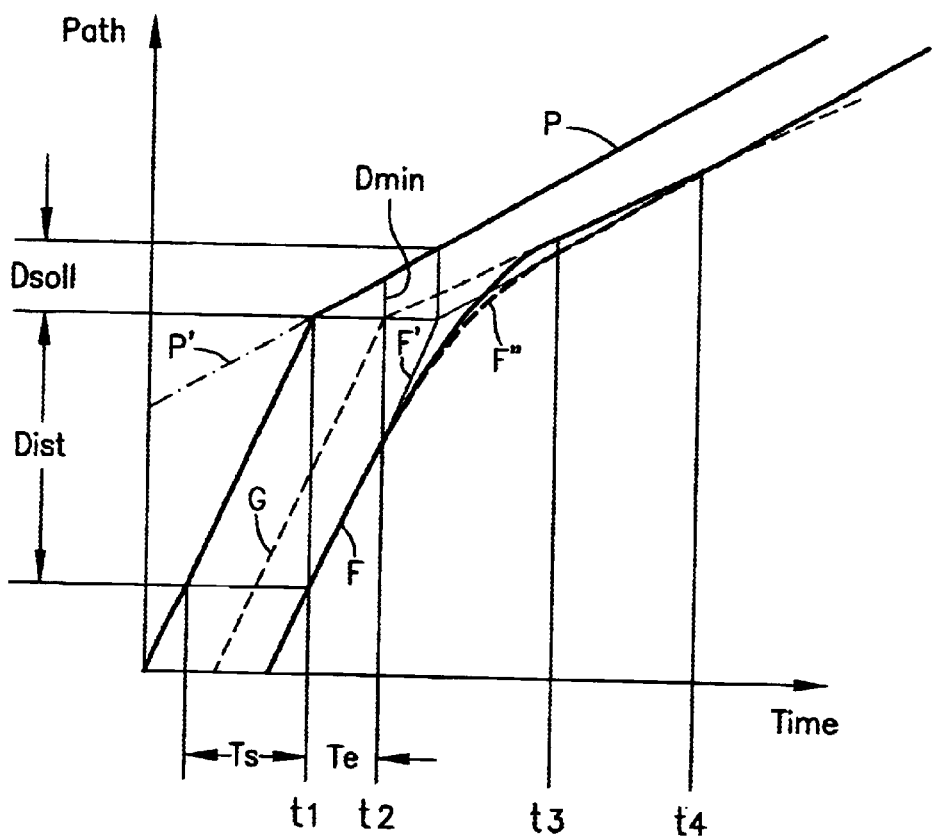
FIG. 2 is a path-time diagram of the vehicle and of a vehicle traveling ahead.

Curve F, which is illustrated in FIG. 2 in thick, solid lines, represents the path-time curve of the vehicle, which is provided with the adaptive road speed controller. Curve P represents a vehicle traveling ahead. (Reference characters F and P are used hereinafter both for the curves as well as for the vehicles represented by them). Up to time point t1, vehicle P travels at a constant velocity, and the velocity of vehicle F is regulated in the context of proximity control so that it follows vehicle P at the same velocity at a specific distance Dist. Distance Dist corresponds to the setpoint distance appropriate to the velocity in question, and it is equal to the product of a setpoint time gap Ts and velocity V of vehicle F.

In the illustrated example, it is assumed for the sake of simplicity that vehicle P traveling ahead is abruptly braked at time point t1 and then continues to travel at a slower speed. If the temporal interval between vehicles P and F were always precisely equal to setpoint time gap Ts, then the associated path-time curve for vehicle F would be represented by curve F', indicated by solid lines, which derives from curve P as a result of a parallel shift of Ts. From the reduced velocity of the two vehicles, a correspondingly smaller setpoint distance Dsoll is then generated on the basis of same setpoint time gap Ts. Therefore, vehicle F may, within a limited time, reduce its velocity from the original velocity to the new velocity of the vehicle traveling ahead, so that it may follow vehicle P at new distance Dsoll. However, because Dsoll is smaller than previous distance Dist, vehicle F does not need to abruptly brake, as is indicated by curve F', but rather the deceleration may occur somewhat more gently, as is indicated by the thick dotted line curve F". This curve guarantees that (new) setpoint distance Dsoll will not be undershot at any time point. However, for this purpose, a relatively strong deceleration of vehicle F is still required, and this deceleration is often experienced by the vehicle occupants as disturbing or at least as comfort reducing. Therefore, in the method according to the present invention, the vehicle is only more weakly decelerated, as is indicated by curve F. In this context, it is consciously accepted that the distance between vehicles F and P will temporarily fall below setpoint distance Dsoll. This means that following vehicle F dips temporarily into the setpoint distance of vehicle P traveling ahead and then only slowly returns once again to setpoint distance Dsoll. In this context, of course, the depth of the dip may be limited so that between vehicles F and P a safe minimum distance Dmin is always maintained. This minimum distance Dmin is the product of velocity V of vehicle F and a dip time gap Te, which is smaller than setpoint time gap Ts.

Curve G illustrated in FIG. 2 represents a fictitious vehicle, which follows vehicle P to time point t2 at a temporal deceleration that corresponds to dip time gap Te. From time point t2 on, however, curve G is flatter than curves P and F'. This means that the velocity of fictitious vehicle G, from time point t2 on, is smaller in the absolute sense than the velocity of vehicle P, so that the spatial and temporal interval by time t4 is again increased to setpoint distance Dsoll and setpoint time gap Ts. The velocity of vehicle F is regulated in the context of the dip strategy so that the associated path-time curve touches curve G but does not intersect it. At time point t3, curve G forms a tangent on curve F. From this time point on, vehicle F no longer needs to be decelerated, but rather it may travel further at that essentially constant velocity until at time point t4 setpoint distance Dsoll is again established, and the regular proximity control process may again be undertaken.

Figure 3:
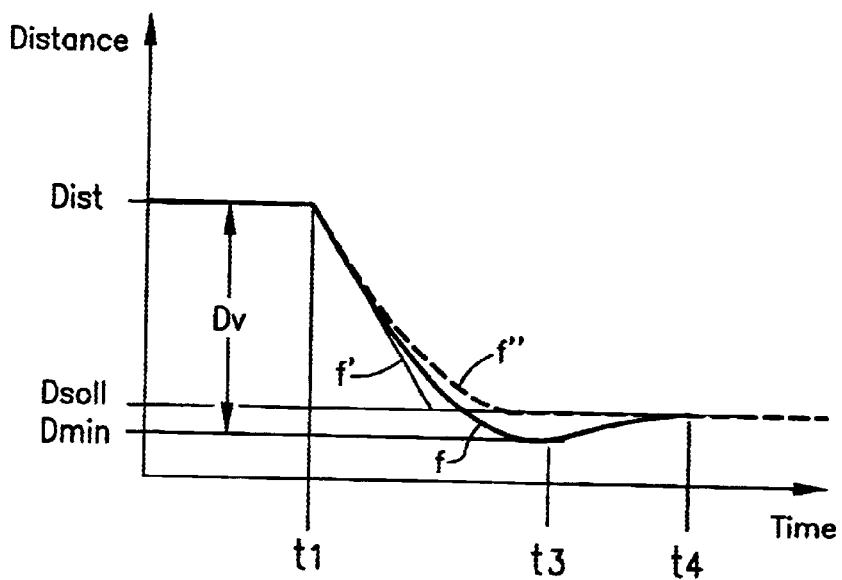
FIG. 3 is, in a time diagram corresponding to that illustrated in FIG. 2, the change in the distance between the vehicle and the vehicle traveling ahead.

In FIG. 3, the same sequence is illustrated as in FIG. 2 in the form of a distance-time diagram. Curve f indicates the distance between vehicles P and F. Curve f' illustrates a change in the distance, which corresponds to curve F' illustrated in FIG. 2, and curve f" represents a change in the distance corresponding to curve F" illustrated in FIG. 2. Curve F" is one branch of a parabola, the lower apex of which is at Dsoll. The segment of curve f between t1 and t3 is one part of a parabola, the lower apex of which is approximately at minimum distance Dmin and which at time point t3 has a slight positive slope, which indicates the increase of the vehicle distance corresponding to the return velocity. The vehicle distance at time point t3 does not precisely conform with the minimum distance Dmin in the strictest sense of the word, but this difference in practice is not significant.

Deceleration distance Dv, within which the velocity of vehicle F declines from the beginning value at time t1 to the target velocity (velocity of vehicle traveling ahead P minus the return velocity) at time t3, corresponds in FIG. 3 roughly to the difference between Dist and Dmin and is therefore significantly greater than the difference between Dist and Dsoll. The difference between Dsoll and Dmin corresponds to the depth of the dip, by which the vehicle dips into the setpoint distance.

Acceleration a0 of the vehicle, corresponding to curve F illustrated in FIG. 2, is a function of deceleration distance Dv, relative velocity Vrel between the two vehicles, and desired return velocity Vrück. Required velocity change dV is equal to Vrel−Vrück. In this context, dV and Vrel are negative at least at the beginning, whereas for Vrück a positive value is always selected. The following then applies:

$$a0 = \text{sign}(dV)dV^2/2Dv. \quad (1)$$

If vehicle F between t1 and t3 constantly maintains this acceleration, then the distance to vehicle P traveling ahead has the curve indicated by curve f illustrated in FIG. 3, assuming that the velocity of vehicle P traveling ahead does not change. If vehicle P traveling ahead experiences an acceleration ap within this time, then the acceleration of vehicle F is corrected as follows:

$$ac = a0 + ap. \quad (2)$$

Figure 4:
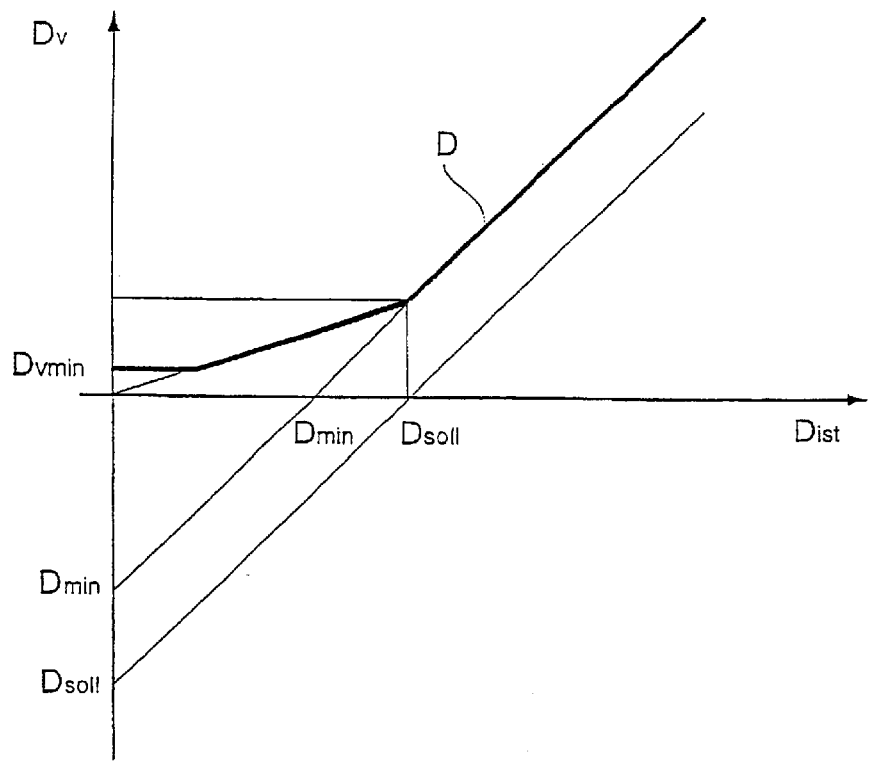
FIG. 4 is a diagram illustrating the relationship between the actual distance of the vehicle traveling ahead and a deceleration distance taken as a basis for the distance limiting process.

From equation (1), it may be seen that Dv is not permitted to be zero, because otherwise in calculating the acceleration there would have to be a division by zero. For this reason, Dv is not always calculated in accordance with the equation $$Dv = Dist - Dmin = Dist - V\,Te, \quad (3)$$

but rather in accordance with the equation which is represented by curve D illustrated in FIG. 4. Equation (3) therefore only applies to the case in which Dist is larger than or equal to Dsoll. Dv in any case is greater than a minimum value Dvmin (for example, 2 meters). If Dist is smaller then Dsoll, then Dv continually decreases to minimum value Dvmin. Dv is generally calculated in accordance with the formula:

$$Dv = \text{MAX}(Dvmin, Dist(Dsoll - Dmin)/Dsoll, Dist - Dmin). \quad (4)$$

Figure 5:
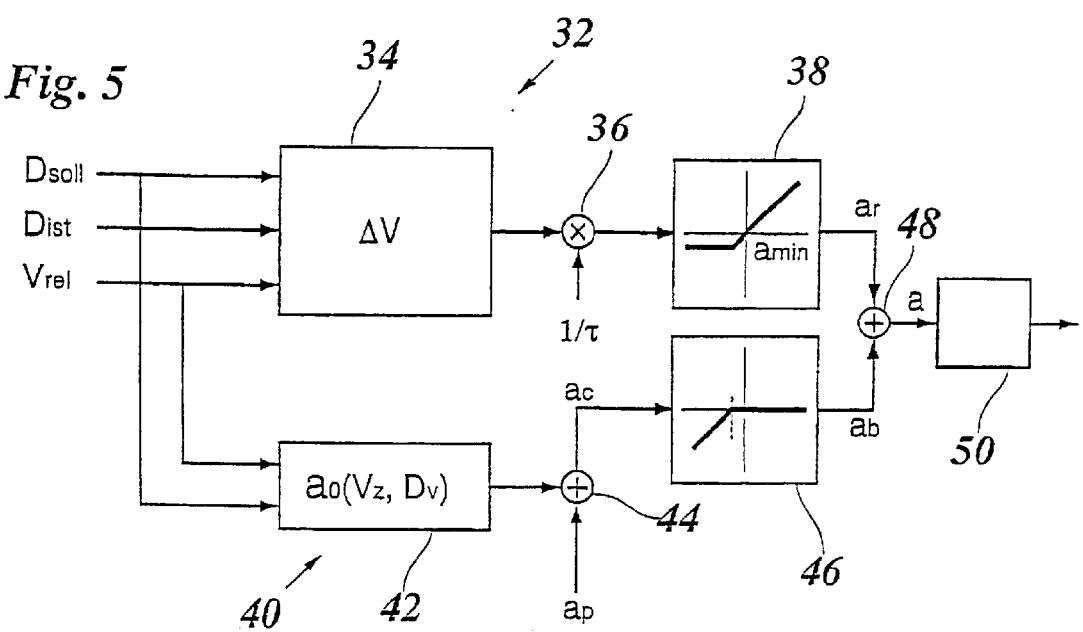
FIG. 5 is a block diagram of the system for proximity control and proximity limiting.

FIG. 5 in a block diagram illustrates the essential functional parts of a proximity controller and of a proximity limiter, which are implemented using appropriate programs executed in microcomputer 14.

A proximity-controller part 32, which is responsible for the normal proximity control process in response to moderate changes in the velocity of the vehicle traveling ahead, includes a characteristics field 34, a multiplication member 36, and a limiting part 38. Characteristics field 34 receives as input signals setpoint distance Dsoll, measured vehicle distance Dist, and measured relative velocity Vrel, and from these input quantities it ascertains a setpoint velocity change DV. Using multiplication member 36, DV is multiplied by a regulating amplifier 1/t, by the inverse value of a time constant t, so that an acceleration value is obtained as the result. This acceleration value is limited in limiting part 38 to values above a specific (negative) threshold acceleration amin. Limiting part 38 delivers an acceleration setpoint value ar, as an output signal for the proximity control process.

Due to the effect of limiting part 38, no vehicle decelerations that are greater than the amount of amin are possible within the context of this proximity control process. In an abrupt change in the velocity of the vehicle traveling ahead, as in the case of the example discussed in conjunction with FIG. 2, controller part 32 is therefore not able to maintain setpoint distance Dsoll. In this case, a distance limiting process occurs using a distance limiting part 40. This distance limiting part 40 includes a characteristics field or a calculation module 42, an addition member 44, and a further limiting part 46. First, calculation module 42 calculates from the measured data (generally negative) velocity change dV (=Vrel−Vrück) and, on the basis of the equation illustrated in FIG. 4, deceleration distance Dv, and then from this it calculates, in accordance with the equation (1), uncorrected acceleration a0. Measured and, if necessary, appropriately filtered own acceleration ap of the vehicle traveling ahead is added thereto in addition member 44, so that corrected acceleration ac is supplied to limiting part 46. In limiting part 46, corrected acceleration value ac is limited on the up side by amin and, at the same time, is increased by -amin, so that received acceleration setpoint value ab, for the distance limiting process, may only take on negative values. Acceleration setpoint values ar and ab from proximity controller part 32 and from proximity limiting part 40 are then added in an addition member 48, and the sum, obtained as setpoint value a, is finally supplied to another return limiter 50, which dampens abrupt changes in the acceleration so as to improve the driving comfort.

In the example illustrated in FIGS. 2 or 3, distance controller part 32 is essentially active until time point t1, whereas distance limiting part 40 supplies in any case a negligible contribution to finally-output setpoint acceleration a, because the relative velocity is close to zero and therefore velocity change dV is very small. Because return velocity Vrück is only required to reestablish the setpoint distance after a dipping process, dV may always be equal to Vrel if Dist is greater than Dsoll. If at time t1 the vehicle traveling ahead is braked, then the setpoint acceleration, or deceleration ar, which may be represented by the controller part, is no longer sufficient to maintain the setpoint distance. The setpoint acceleration is then determined by output value ab of the distance limiting part, so that vehicle F in the manner indicated in FIGS. 2 and 3 dips into the setpoint distance. In this context, the values of dV and Dv are continually adjusted. Because actual distance Dist is smaller than Dsoll, then for determining Dv the more planar part of curve D illustrated in FIG. 4 is effective. The velocity of the vehicle gradually approaches the target velocity, with the result that setpoint acceleration ab, which is output by distance limiting part 40, in its amount again approaches zero, until finally distance controller part 32 again dominates and, for example, from time point t4 the proximity controlling process is continued.

In FIG. 2, as an example, the case is illustrated that the velocity of vehicle P traveling ahead at a specific time point t1 abruptly decreases. However, the same dipping strategy is also followed in the case in which vehicle P traveling ahead from the beginning has a relatively low constant velocity, as illustrated in FIG. 2 is indicated by the dot-dash curve P', and following vehicle F travels at a higher velocity until at time point t1 the vehicle traveling ahead is located by the radar system.

Whereas, in the example embodiment described, for determining the depth of the dip a constant dip time gap is assumed, in other example embodiments it is also possible to use other characteristic quantities as a measure for the depth of the dip. For example, a constant dip distance Dmin is preestablished, or the dip distance may be selected as proportional to the setpoint distance. Similarly, it is also possible to vary return velocity Vrück in accordance with the situation.

What is claimed is:

1. A method for controlling a distance of a vehicle to a vehicle traveling ahead, comprising the steps of:
    measuring a distance and a relative velocity of the vehicle traveling ahead;
    in a distance control mode, controlling the distance by one of accelerating or decelerating the vehicle to a preestablished setpoint distance, the deceleration permitted in the distance control mode being limited; and
    transitioning, when the setpoint distance cannot be maintained at the limited deceleration, from the distance control mode to a process limiting the distance to a minimum distance that is smaller than the setpoint distance and, after reaching the minimum distance, further decelerating the vehicle so that the distance increases to the setpoint distance.

2. The method according to claim 1, wherein the distance limiting process includes the substeps of:
    calculating an acceleration of the vehicle, during a time in which the distance between the vehicle and the vehicle traveling ahead is reduced by a preestablished deceleration distance that is greater than the difference between the distance and the setpoint distance, a velocity change occurs, an amount of the velocity change corresponding at least to the relative velocity; and
    adding an own acceleration of the vehicle traveling ahead to the calculated acceleration.

3. The method according to claim 2, further comprising the step of continually varying the deceleration distance as a function of the distance and of the velocity of the vehicle.

4. The method according to claim 3, wherein the deceleration distance is equal to a difference between the distance and the minimum distance as long as the distance is greater than the setpoint distance.

5. The method according to claim 4, wherein the deceleration distance is always greater than a positive minimum value.

6. The method according to claim 5, further comprising the step of calculating the deceleration distance according to the formula:

Dv=MAX(Dvmin, Dist (Dsoll−Dmin)/Dsoll, Dist−Dmin);

wherein Dv represents the deceleration distance, Dvmin represents the positive minimum value, Dist represents the distance, Dsoll represents the setpoint distance and Dmin represents the minimum distance.

7. The method according to claim 2, further comprising the step of determining the velocity change as long as the distance is smaller than the setpoint distance by subtracting from the relative velocity a preestablished positive return velocity.

8. The method according to claim 1, further comprising the step of determining a first setpoint acceleration of the vehicle by linking a second setpoint acceleration, ascertained in the distance control mode, and a third setpoint acceleration, ascertained in the distance limiting process, the second setpoint acceleration dominating above a preestablished negative threshold acceleration, the third setpoint acceleration dominating below the preestablished negative threshold acceleration.

9. A device for controlling a distance of a vehicle to a vehicle traveling ahead, comprising:
    a velocity measuring device that measures a distance and a relative velocity of the vehicle traveling ahead; and
    a data-processing device including a distance control part that determines a first setpoint acceleration to control the distance to the vehicle traveling ahead at a preestablished setpoint distance, the first setpoint acceleration output by the distance control part limited to accelerations above a preestablished negative limiting value, the data-processing device further including a distance limiting part, such that when the setpoint distance is undershot, to be operative and to determine a second setpoint acceleration such that the distance to the vehicle traveling ahead is limited to a minimum distance that is smaller than the setpoint distance and such that the velocity of the vehicle is returned to a value that is smaller than the velocity of the vehicle traveling ahead.

* * * * *